(12) United States Patent
Richard

(10) Patent No.: US 9,021,032 B2
(45) Date of Patent: Apr. 28, 2015

(54) METHOD AND SYSTEM FOR ENABLING ANONYMOUS COMMUNICATIONS BETWEEN TWO OR MORE INTERESTED PARTIES

(76) Inventor: Postrel Richard, Miami Beach, FL (US)

(*) Notice: Subject to any disclaimer, the term of this patent is extended or adjusted under 35 U.S.C. 154(b) by 452 days.

(21) Appl. No.: 13/399,259

(22) Filed: Feb. 17, 2012

(65) Prior Publication Data

US 2013/0218983 A1     Aug. 22, 2013

(51) Int. Cl.
| | |
|---|---|
| H04M 3/42 | (2006.01) |
| H04L 29/06 | (2006.01) |
| H04W 12/02 | (2009.01) |
| H04L 29/08 | (2006.01) |
| H04L 12/58 | (2006.01) |
| H04L 12/18 | (2006.01) |
| H04W 88/18 | (2009.01) |
| G06Q 50/00 | (2012.01) |

(52) U.S. Cl.
CPC ........... *H04L 63/0421* (2013.01); *H04W 12/02* (2013.01); *H04W 88/184* (2013.01); *H04L 67/14* (2013.01); *H04L 67/28* (2013.01); *H04M 3/42008* (2013.01); *G06Q 50/01* (2013.01); *H04L 51/28* (2013.01); *H04L 12/1818* (2013.01)

(58) Field of Classification Search
CPC ... H04W 12/02; H04L 65/1063; H04L 67/14; H04M 3/42008; G06Q 50/01
USPC .......................................... 709/206; 455/411
See application file for complete search history.

(56) References Cited

U.S. PATENT DOCUMENTS

| | | | | |
|---|---|---|---|---|
| 5,884,272 | A  * | 3/1999  | Walker et al. ................. | 705/319 |
| 6,665,389 | B1 * | 12/2003 | Haste, III ...................... | 379/196 |
| 7,545,784 | B2 * | 6/2009  | Mgrdechian et al. ......... | 370/338 |
| 8,014,763 | B2 * | 9/2011  | Hymes ....................... | 455/414.2 |
| 2001/0026609 | A1 * | 10/2001 | Weinstein et al. ......... | 379/93.01 |
| 2005/0174975 | A1 * | 8/2005  | Mgrdechian et al. ......... | 370/338 |
| 2006/0256959 | A1 * | 11/2006 | Hymes ..................... | 379/433.04 |
| 2007/0106892 | A1 * | 5/2007  | Engberg ....................... | 713/168 |
| 2007/0282621 | A1 * | 12/2007 | Altman et al. .................... | 705/1 |
| 2008/0051033 | A1 * | 2/2008  | Hymes ............................ | 455/47 |
| 2008/0076418 | A1 * | 3/2008  | Beyer, Jr. .................. | 455/435.1 |
| 2008/0154895 | A1 * | 6/2008  | Carmony .......................... | 707/6 |
| 2009/0117883 | A1 * | 5/2009  | Coffing et al. ............. | 455/414.1 |
| 2010/0180009 | A1 * | 7/2010  | Callahan ........................ | 709/217 |
| 2011/0093340 | A1 * | 4/2011  | Kramer et al. ............. | 705/14.58 |
| 2013/0091209 | A1 * | 4/2013  | Bennett et al. ............... | 709/204 |
| 2013/0198281 | A1 * | 8/2013  | Scuba et al. ................. | 709/204 |
| 2013/0276140 | A1 * | 10/2013 | Coffing et al. ................. | 726/27 |
| 2014/0136617 | A1 * | 5/2014  | Singer et al. ................. | 709/204 |

OTHER PUBLICATIONS

Sherwood, Rob, Bobby Bhattacharjee, and Aravind Srinivasan. "P 5: A protocol for scalable anonymous communication." Journal of Computer Security 13.6 (2005): 839-876.*

* cited by examiner

*Primary Examiner* — Jimmy H Tran
(74) *Attorney, Agent, or Firm* — Barkume & Associates, P.C.

(57) ABSTRACT

A method and system for communicating anonymously between two parties until such time that the parties may wish to reveal their identities to each other. This is accomplished by using a portable device that enables anonymous communications between a sender (operating a sender device such as a smartphone) and a recipient (operating a recipient device such as a smartphone) via an anonymous communications server computer.

21 Claims, 4 Drawing Sheets

METHOD AND SYSTEM FOR ENABLING ANONYMOUS COMMUNICATIONS BETWEEN TWO OR MORE INTERESTED PARTIES

TECHNICAL FIELD

This invention relates to a method and system that enables two or more parties to communicate with each other anonymously via an intermediate computer acting as a bridge or proxy between the parties.

BACKGROUND OF THE INVENTION

Often times people encounter others in a social or even business setting in which they would like to meet the other person, but are too shy or reserved to initiate a formal introduction of themselves to that person. That is, they would like to meet but in an anonymous manner so that if the meeting is not fruitful they may cutoff any further communication without fear of subsequent unwanted contact. In the alternative, a person may sense that the other person may have similar fears and may wish to give that person the opportunity to engage in an anonymous communication if desired.

SUMMARY OF THE INVENTION

The present invention is therefore a method and system for communicating anonymously between two (or more) parties until such time that the parties may wish to reveal their identities to each other. This is accomplished by using a portable device that enables anonymous communications between a sender (operating a sender device such as a smartphone) and a recipient (operating a recipient device such as a smartphone) via an anonymous communications server computer. First, a sender identification tag that enables the anonymous communications server computer to communicate with the sender device is stored on a portable device. The portable device is provided to a recipient, which may be as simple as the sender handing it to the recipient in an anonymous manner.

The recipient may interconnect the portable device with a recipient device, such as by plugging it into the recipient device. After interconnection, the portable device will transfer the sender identification tag to the recipient device, and recipient device initiates communications with an anonymous communications server computer (e.g. by using anonymous communications server computer contact properties obtained from the portable device) and transmits the sender identification tag to the anonymous communications server computer. The anonymous communications server computer uses sender device contact properties associated with the sender identification tag to initiate communication with the sender device and then executes an anonymous communication session between the recipient device and the sender device. Thus, the anonymous communications server computer acts as a bridge between the recipient and the sender whereby the recipient can initiate communications with the sender even though he or she does not know his identity or specific contact information, and the recipient can maintain his or her anonymity if desired.

In one embodiment, the sender ID tag contains the sender device contact properties that enable the anonymous communications server computer to initiate communication with the sender device. In an alternative embodiment, the anonymous communications server computer uses the sender ID tag to lookup in a sender database the sender device contact properties that enable the anonymous communications server computer to initiate communication with the sender device.

For example, the sender device contact properties may include a sender device telephone number, and the anonymous communications server computer initiates communication with the sender device by calling the sender device using the sender device telephone number. In this case, the anonymous communication session is an anonymous telephone call between the recipient device and the sender device that is bridged through the anonymous communications server computer such that the sender device is unable to determine the telephone number of the recipient device and the recipient device is unable to determine the telephone number of the sender device.

In another example, the sender device contact properties may include a sender device telephone number, and the anonymous communications server computer initiates communication with the sender device by sending a recipient text message to the sender device using the sender device telephone number. In this case, the anonymous communication session is an anonymous text messaging session between the recipient device and the sender device that is bridged through the anonymous communications server computer such that the sender device is unable to determine the telephone number of the recipient device and the recipient device is unable to determine the telephone number of the sender device. This may be accomplished by the sender device receiving the recipient text message from the anonymous communications server computer, the sender device generating a response text message and sending the response text message to the anonymous communications server computer, and the anonymous communications server computer receiving the response text message and sending the response text message to the recipient device.

In another example, the sender device contact properties may include a sender device email address, and the anonymous communications server computer initiates communication with the sender device by sending a recipient email message to the sender device using the sender device email address. In this case, the anonymous communication session is an anonymous email messaging session between the recipient device and the sender device that is bridged through the anonymous communications server computer such that the sender device is unable to determine the email address of the recipient device and the recipient device is unable to determine the email address of the sender device. This may be accomplished by the sender device receiving the recipient email message from the anonymous communications server computer, the sender device generating a response email message and sending the response email message to the anonymous communications server computer, and the anonymous communications server computer receiving the response email message and sending the response email message to the recipient device.

The recipient device may for example be a smartphone such as an IPHONE (or a tablet such as an IPAD) that has a dock connector. The portable device would then have a mating connector, such that the recipient may insert the mating connector of the portable device into the dock connector of the smartphone to enable communications between these devices. This allows the sender identification tag to be transferred to the recipient device and causes the recipient device to initiate communications with the anonymous communications server computer.

In an optional embodiment, a sender information file may be loaded onto and stored on the portable device. The sender information file may include an image file, video file, audio file and/or text file, which would provide some information about the sender to the recipient without revealing his or her identity or contact information. The recipient device would then be enabled to access the sender information file when the recipient device is interconnected to the portable device.

In a similarly optional embodiment, the recipient device may transmit a recipient information file to the sender device via the anonymous communications server computer. The recipient information file may include an image file, video file, audio file and/or text file, which would provide some information about the recipient to the sender without revealing his or her identity or contact information. The sender device would then be enabled to access the recipient information file from the anonymous communications server computer.

Optionally, in a first multi-party embodiment operating in a series mode, the following additional steps are carried out. The recipient stores on the portable device a second sender identification tag that enables communication with the recipient device, and provides the portable device to a second recipient. The second recipient interconnects the portable device with a second recipient device. The portable device provides the second sender identification tag to the second recipient device, which initiates communications with the anonymous communications server computer. The second recipient device transmits the second sender identification tag to the anonymous communications server computer, which uses second sender device contact properties associated with the second sender identification tag to initiate communication with the recipient device. The anonymous communications server computer executes an anonymous communication session between the sender device, the recipient device, and the second recipient device.

Alternatively, in a second multi-party embodiment operating in a parallel mode, the following additional steps are carried out. The sender identification tag is stored on a second portable device, which is then provided by the sender to a second recipient. The second recipient interconnects the portable device with a second recipient device, which provides the sender identification tag to the second recipient device. The second recipient device initiates communications with the anonymous communications server computer and transmits the sender identification tag to the anonymous communications server computer. The anonymous communications server computer uses sender device contact properties associated with the sender identification tag to initiate communication with the sender device, and the anonymous communications server computer executes an anonymous communication session between the sender device, the recipient device, and the second recipient device.

Either or both of these multi-party modes would thereby form an anonymous social network.

DESCRIPTION OF THE PREFERRED EMBODIMENTS

The present invention enables two parties to communicate with each other in an anonymous manner until such time that either or both of the parties wishes to reveal to the other his or her identity or contact information. Communications in this anonymous manner may take place by telephone call, text message, email messages or the like, as may be desired by either or both of the parties. The anonymous communications are made via an anonymous communications server computer which acts as a bridge or proxy between the parties. It is noted that although the present invention is described with respect to two parties, more than two parties may communicate with each other anonymously in the same manner. This will be described below as anonymous social networking.

Figure 1:
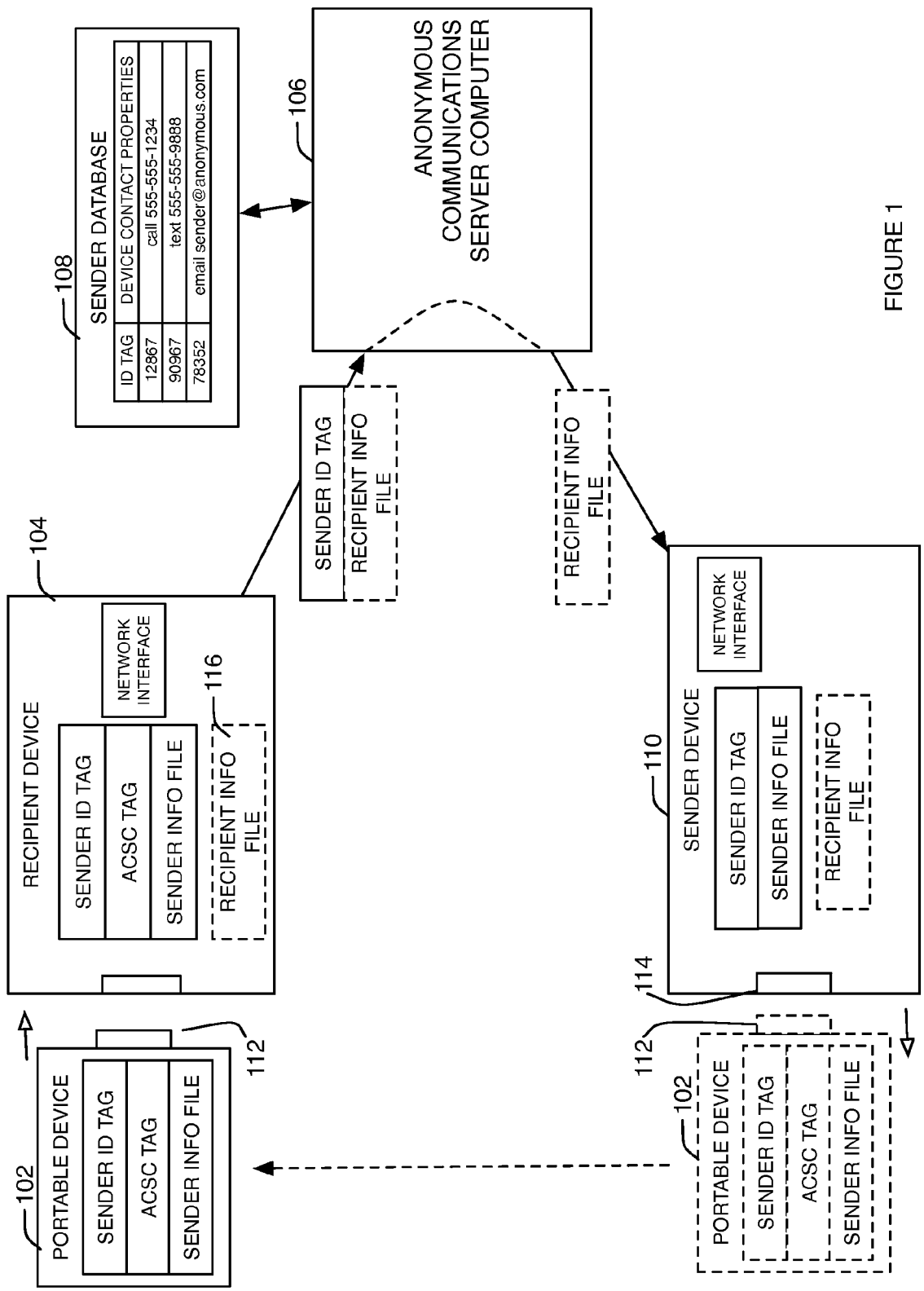
FIG. 1 is a block diagram of the preferred embodiment system of the present invention.
Figure 2:
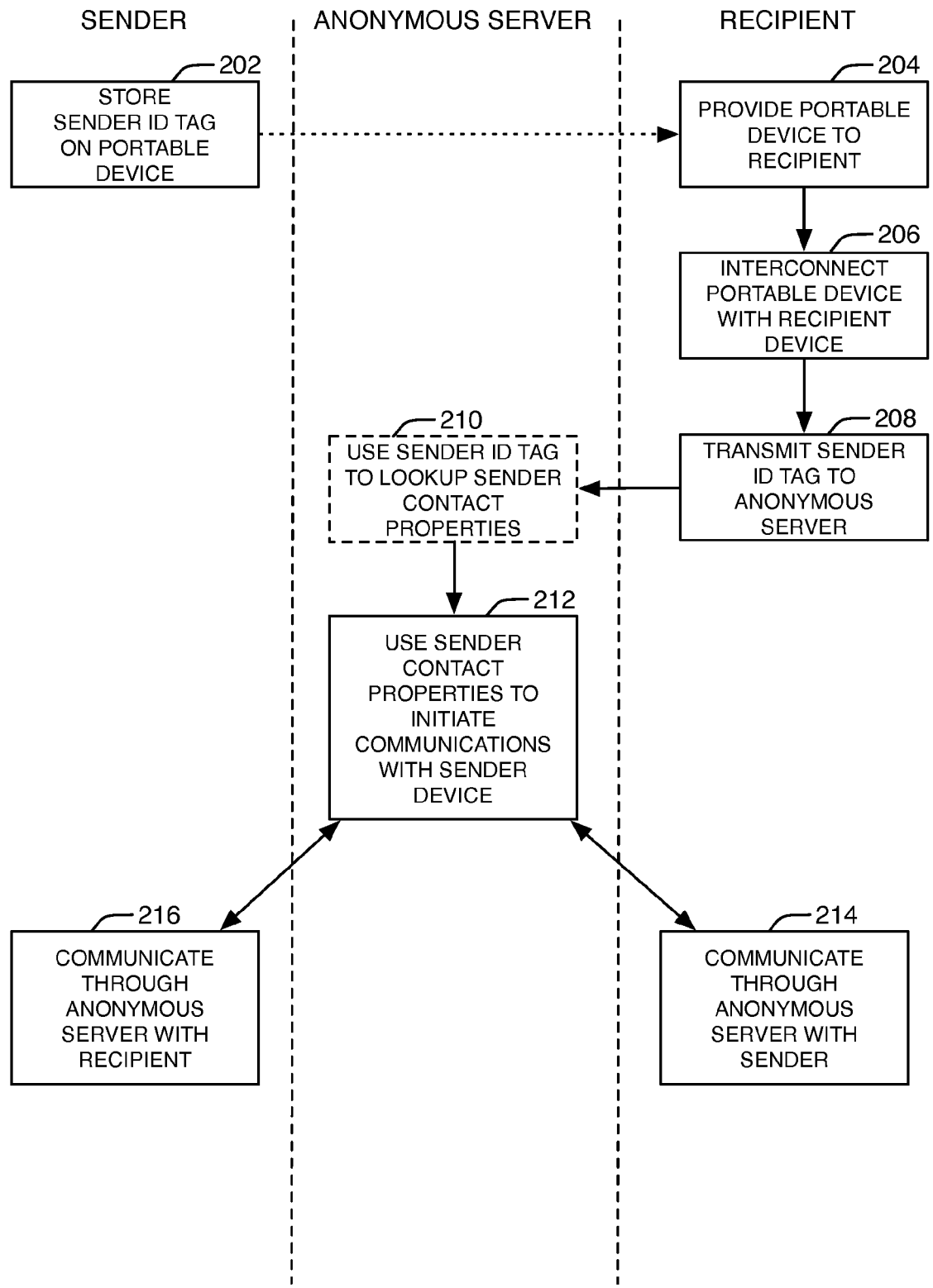
FIG. 2 is a flowchart of the preferred embodiment method of the present invention.

The preferred embodiment is now described with respect to the block diagram of FIG. 1 and the flowchart of FIG. 2. As shown on FIG. 1, the major components of the system are a portable device 102, a recipient device 104, an anonymous communications server computer 106, a sender database 108, and a sender device 110, all of which are now described in detail with respect to a teaching but non-limiting example of the usage of this system and methodology.

The preferred embodiment of the present invention finds usefulness in a situation in which one person (referred to as a sender) wishes to meet with and engage in communications with another person (referred to as a recipient), such as when the sender sees the recipient in social setting such as at a bar or party. In many situations the sender may be too shy and reserved to initiate a conversation with the recipient, and/or the sender may fear that the recipient may be too shy to engage in conversation at that time. With this invention, the sender is able to provide the recipient with a token (the portable device 102) that will enable the recipient to initiate an anonymous communication with the sender at a subsequent time. For example, the sender could simply walk up to the recipient and hand the portable device 102 to the recipient and then walk away without conversing or engaging in any other communications. If the recipient is interested in the sender (perhaps due to across the room eye contact), then the recipient can use the portable device in the manner described herein.

Figure 3:
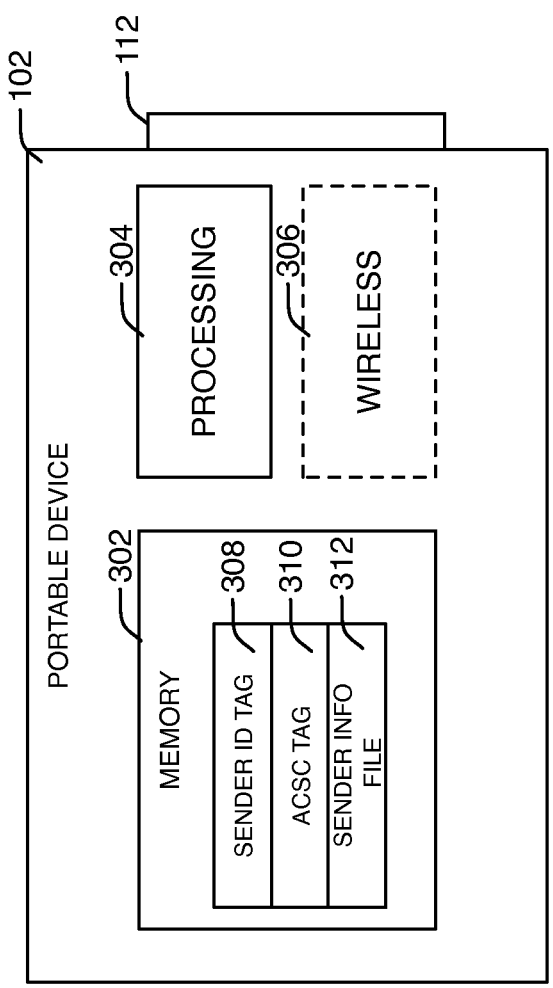
FIG. 3 is a block diagram of the portable device used in the present invention.

As shown in FIG. 3, the portable device 102 is a small token such as a keyfob that has memory 302, processing circuitry 304, and a connector 112. In a preferred embodiment, the connector 112 is a 30-pin connector that will interface in a known manner with the 30-pin dock connector found in an IPHONE device (or an IPAD tablet device). This would enable the portable device 102 to be easily inserted into and communicate with a recipient device that is an IPHONE as well as a sender device 110 that is an IPHONE. The portable device may have additional or alternative connectors, including but not limited to an ANDROID phone connector, a USB connector, a mini-USB connector, a micro-USB connector, etc. In the alternative, the portable device 102 may have wireless circuitry 306 for wireless communication capabilities that would not require a physical connection with the recipient device 104 or the sender device 110, such as BLUETOOTH, NFC, and the like.

As a preliminary step 202, the sender (the party who originally has the portable device 102) will store a sender identification (ID) tag 308 in the memory 302 of the portable device 102. This may be accomplished by inserting the portable device 102 into the sender device 110; in particular by interconnecting the portable device connector 112 with the mating sender device connector 114. Once the portable device 102 is docked with the sender device 110, an application executing on the sender device 110 will enable the sender to enter his or her sender device contact properties into the sender device 110. This may for example be a telephone number, a mobile telephone number, and/or an email address of the sender. In the preferred embodiment, the sender device contact properties are included in the sender ID tag directly in an encrypted or otherwise obfuscated manner so that the recipient device will be unable to display them to the recipient or otherwise use them without aid of the anonymous communications server computer. In an alternative embodiment to be described later, the sender device contact properties are not placed into the sender ID tag, but rather a sender code is placed into the sender ID tag that is later matched to the sender device contact properties by the anonymous communications server computer. Once the sender has caused the sender device contact properties to be stored in the sender ID tag, the sender ID tag is transferred into the memory 302 of the portable device 102.

Additionally, an anonymous communications server computer tag 310 that includes anonymous communications server computer contact properties is stored in the memory 302 of the portable device 102. The anonymous communications server computer contact properties contains the information required by the recipient device to ultimately communicate with the anonymous communications server computer 106 in an automatic and anonymous manner. The anonymous communications server computer contact properties may for example be a telephone number of the anonymous communications server computer 106, an IP address, a URL, etc. The anonymous communications server computer tag may be preloaded onto the portable device 102 prior to use by the sender, or the tag may be transferred from the sender device 110 in the same manner as the sender ID tag. In any event, the sender ID tag 308 and the anonymous communications server computer tag 310 will be stored in the memory 302 of the portable device 102, and then the portable device 102 may be undocked from the sender device 110. The sender may then place the portable device in his pocket or otherwise carry it until he or she is ready to use it.

At some subsequent time, the sender will see someone with whom he would like to initiate an anonymous conversation, such as at a bar or party, who is called the recipient. The sender would give the portable device to the recipient in any desired manner at step 204. He may simply walk up to the recipient and give her the portable device 102. There may be an instruction printed on the portable device urging the recipient to insert it into her IPHONE device, or pair with it by BLUETOOTH communications, etc. Assuming that the recipient is intrigued by this, she will take out her IPHONE (the recipient device 104) and at step 206 interconnect the portable device 102 in the same manner as the sender had previously docked the portable device 102. This will cause the portable device 102 to interoperate with the recipient device 104 in the following manner.

The portable device 102 will sense that the recipient's IPHONE is a recipient device 104 and cause an application stored on the portable device 302 to execute that will prompt the recipient to allow anonymous communications with the sender, such as by displaying a message on the display of the recipient device 104 such as "The person who gave you this would like to meet you anonymously—if you are interested press here"

By pressing a designated button on the touchscreen display of the recipient device 104, the recipient indicates her acquiescence to the subsequent anonymous communications. This will cause the recipient device to initiate communications with the anonymous communications server computer 106. This may be done by by using anonymous communications server computer contact properties obtained from the anonymous communications server computer tag 310 in the portable device. The portable device will be caused by the application to provide the sender ID tag 308 to the recipient device 104, and the recipient device 104 will at step 208 transmit the sender ID tag 308 to the anonymous communications server computer 106 without the recipient being able to understand any of the information contained within the sender ID tag 308 due to its encryption or obfuscation.

The anonymous communications server computer 106 then receives the sender ID tag 308 from the recipient device 104. Since, in this embodiment, the sender device contact properties are included directly within the sender ID tag 308, the anonymous communications server computer will read the sender device contact properties from the sender ID tag. Since the sender ID tag 308 has been encrypted or obfuscated, the tag data must be decrypted or deobfuscated by the anonymous communications server computer 106. Once this process has occurred, the anonymous communications server computer 106 will use the sender device contact properties taken from the sender ID tag 308 to initiate communication with the sender device 110 at step 212 and execute an anonymous communication session between the recipient device 104 and the sender device 110 at steps 214 and 216.

In the case in which the sender ID tag 308 includes the telephone number of the sender device as the sender device contact property, then the anonymous communications server computer 106 will initiate communication with the sender device 110 by calling the sender device using the sender device telephone number. In this case, the anonymous communication session is an anonymous telephone call between the recipient device 104 and the sender device 110 that is bridged through the anonymous communications server computer such that the sender device 110 is unable to determine the telephone number of the recipient device 104 and the recipient device 104 is unable to determine the telephone number of the sender device 110. The anonymous communications server computer acts as a proxy in that the communication sessions are held between the recipient device 104 and the anonymous communications server computer 106 and between the anonymous communications server computer 106 and the sender device 110, in real time. For example, the call may be set up as a conference call whereby the respective parties may be bridged to each other without being able to discern the other party's telephone number. This ensures anonymity and encourages each party to join the conversation without fear of being identified until they want to be identified.

Optionally, the telephone call could be scheduled by the anonymous communications server computer 106 to occur at a time agreed to by both parties. The recipient would enter into the recipient device 104 desired dates and times for placing the call to the sender device 110, and the telephone number of the recipient device may be obtained by the anonymous communications server computer 106 through caller ID information as well known in the art, or the recipient would specify the telephone number for the anonymous communications server computer 106 to use for the call. The anonymous communications server computer would then contact the sender device 110 and propose a date and time for a call with the recipient based on the data provided by the recipient device 104. Or, the sender could enter into the sender device 110 desired dates and times for having the call with the recipient device 104. In that case the anonymous communications server computer would review the available dates and times entered by both parties and determine a date and time that suits both parties. The anonymous communications server computer would inform both parties of the selected date and time for the call, and then when that date and time arrives the anonymous communications server computer would call both parties and bridge the calls so that the parties may speak with each other anonymously.

Optionally, in this case in which the sender ID tag 308 includes the telephone number of the sender device as the sender device contact property, then the anonymous communications server computer 106 may initiate communication with the sender device 110 by sending a recipient text message to the sender device using the sender device telephone number rather than placing a direct telephone call. In this case, the anonymous communication session is an anonymous text messaging session between the recipient device 104 and the sender device 110 that is bridged through the anonymous communications server computer such that the sender device 110 is unable to determine the telephone number of the recipient device 104 and the recipient device 104 is unable to determine the telephone number of the sender device 110. The anonymous communications server computer acts as a proxy in that the communication sessions are held between the recipient device 104 and the anonymous communications server computer 106 and between the anonymous communications server computer 106 and the sender device 110. Since text messaging is asynchronous in nature, there is no need to schedule the session as with the telephone call example. That is, the sender device 110 receives the recipient text message from the anonymous communications server computer 106. Then at any desired time, the sender device 110 may generate a response text message and send the response text message to the anonymous communications server computer 106. The anonymous communications server computer 106 receives the response text message and sends the response text message to the recipient device 104. The process may continue in the same manner as desired by the parties while maintaining the desired anonymity.

In another case, the sender ID tag 308 includes an email address associated with the sender device 110 as the sender device contact property, and the anonymous communications server computer 106 may then initiate communication with the sender device 110 by sending a recipient email message to the sender device using the sender device email address. In this case, the anonymous communication session is an anonymous email messaging session between the recipient device 104 and the sender device 110 that is bridged through the anonymous communications server computer such that the sender device 110 is unable to determine the email address of the recipient device 104 and the recipient device 104 is unable to determine the email address of the sender device 110. The anonymous communications server computer acts as a proxy in that the communication sessions are held between the recipient device 104 and the anonymous communications server computer 106 and between the anonymous communications server computer 106 and the sender device 110. Since email messaging is asynchronous in nature, there is no need to schedule the session as with the telephone call example. That is, the sender device 110 receives the recipient email message from the anonymous communications server computer 106. Then at any desired time, the sender device 110 may generate a response email message and send the response email message to the anonymous communications server computer 106. The anonymous communications server computer 106 receives the response email message and sends the response email message to the recipient device 104. The process may continue in the same manner as desired by the parties while maintaining the desired anonymity.

Virtually any type of electronic communications may be established between the parties in an anonymous manner using the anonymous communications server computer 106 as a bridge or proxy so that neither party can discern the identity or contact information of the other party. This would include Twitter, Facebook, iChat, Yahoo Messenger, AOL Messenger, and the like.

As explained above, in an alternative embodiment, the sender device contact properties are not placed into the sender ID tag, but rather a sender code is placed into the sender ID tag that is later matched to the sender device contact properties by the anonymous communications server computer. In this embodiment, the anonymous communications server computer uses the sender code of the sender ID tag to access a sender database 108 at step 210 as shown in FIG. 1. The sender database 108 is pre-populated with sender device contact properties as shown. For example, if the sender wants the recipient to initiate an anonymous telephone call, he would insert the sender ID tag 12867, and the anonymous communications server computer would lookup the telephone number 555-555-1234 and call that number when the sender ID tag is received from the recipient device 104 as previously described. Similarly, if the sender wants the recipient to initiate an anonymous text messaging session, he would insert the sender ID tag 90967, and the anonymous communications server computer would lookup the telephone number 555-555-9888 and send the recipient text message to that number when the sender ID tag is received from the recipient device 104. Finally, if the sender wants the recipient to initiate an anonymous email session, he would insert the sender ID tag 78352, and the anonymous communications server computer would lookup the email address sender@anonymous.com and send the recipient email message to that email address when the sender ID tag is received from the recipient device 104.

There may be situations where the sender would like to provide the recipient with some information about the sender in order to entice her to use the portable device to initiate the anonymous communications session. This may also be useful in a situation wherein the recipient may receive multiple portable devices from various senders, and would need to be provided with clues as to which portable device was provided from which sender. Thus, in an alternative embodiment of the invention, a sender information file 312 may be stored in the memory 302 of the portable device 102 as shown in FIG. 3. This sender information file may originate on the sender device 110, and then loaded into memory of the portable device 102 as desired. The sender information file may include an image file, a video file, an audio file and/or a text file, which would provide some information about the sender to the recipient without revealing his or her identity or contact information. For example, the sender information file may be a picture of the sender along with a text description of the sender. After receipt of the portable device 102 from the sender, the recipient device would then be enabled to access the sender information file 312 when the recipient device is interconnected to the portable device. For example, the image file may be displayed on the recipient device to remind the recipient of the sender who gave her the portable device.

Similarly, there may be situations where the recipient would like to provide the sender with some information about the recipient. This may also be useful in a situation wherein the sender may hand out multiple portable devices to various recipients, and would need to be provided with clues as to which portable device was provided to which recipient. Thus, in an alternative embodiment of the invention, a recipient information file 116 may generated on the recipient device 104, and then transmitted to the anonymous communications server computer along with the sender ID tag as previously described. The recipient information file may include an image file, a video file, an audio file and/or a text file, which would provide some information about the recipient to the sender without revealing his or her identity or contact information. For example, the recipient information file may be a picture of the recipient along with a text description of the recipient. After receipt of the sender information file 116 from the anonymous communications server computer, the image file may be displayed on the sender device to remind the sender of the recipient to whom he gave the portable device.

In an alternative embodiment, the portable device 104 may be re-used by the recipient by reprogramming it with the appropriate information to make the recipient become a sender. This may be referred to as a multi-party embodiment operating in series mode. Then the recipient may hand out the portable device to someone else, and a series chain of anonymous communications may propagate. That is, each successive person may if desired be tied in with the prior parties in the chain, so that a series of anonymous communications may be made between two or more parties in the chain. In this series multi-party mode, the recipient behaves as a sender and stores on the portable device a second sender identification tag that enables communication with the recipient device (acting as a second sender device as well), and provides the portable device to a second recipient. The second recipient interconnects the portable device with a second recipient device. The portable device provides the second sender identification tag to the second recipient device, which initiates communications with the anonymous communications server computer. The second recipient device transmits the second sender identification tag to the anonymous communications server computer, which uses second sender device contact properties associated with the second sender identification tag to initiate communication with the recipient device. The anonymous communications server computer executes an anonymous communication session between the sender device, the recipient device, and the second recipient device.

Similarly, a sender may hand out multiple portable devices to multiple recipients, all of whom could communicate anonymously back to the sender or even amongst each other. This may be referred to as a multi-party embodiment operating in parallel mode. Here, the sender identification tag is stored on a second portable device, which is then provided by the sender to a second recipient. The second recipient interconnects the portable device with a second recipient device, which provides the sender identification tag to the second recipient device. The second recipient device initiates communications with the anonymous communications server computer and transmits the sender identification tag to the anonymous communications server computer. The anonymous communications server computer uses sender device contact properties associated with the sender identification tag to initiate communication with the sender device, and the anonymous communications server computer executes an anonymous communication session between the sender device, the recipient device, and the second recipient device.

Figure 4:
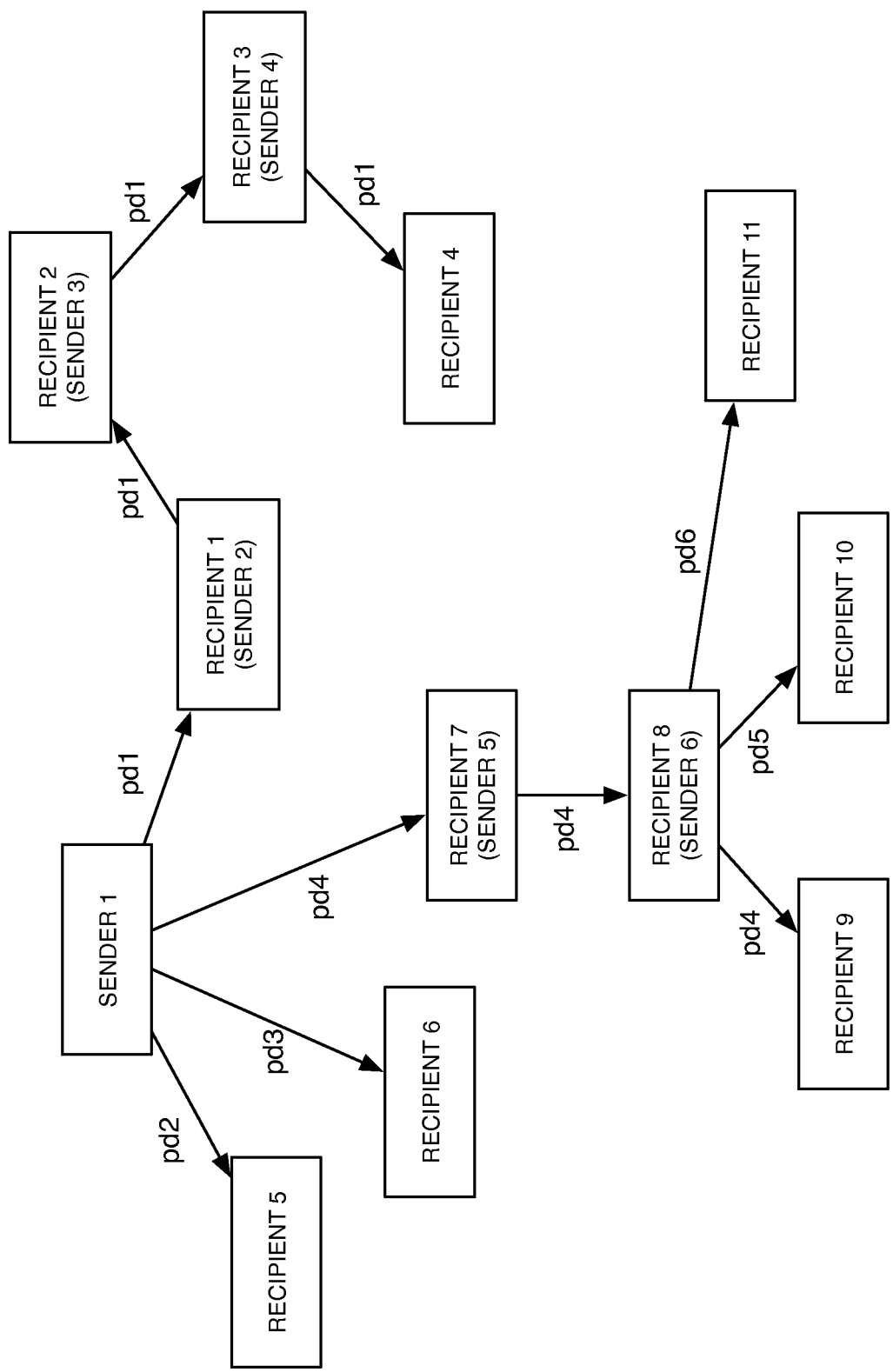
FIG. 4 is an illustration of an anonymous social network that may be formed using the present invention.

In each of these cases, an anonymous social network is formed by distributing a portable device (or a group of portable devices) that enable anonymous communications amongst the parties via the anonymous communications server computer that acts as a bridge or proxy amongst all of the parties. This is illustrated in FIG. 4. Sender 1 provides a portable device pd1 to recipient 1, who re-uses the portable device pd1 and becomes sender 2 by providing pd1 to recipient 2. This chain propagates through to recipient 4 in a similar manner. Sender 1 also provides additional portable devices pd2, pd3, and pd4 to recipients 5, 6 and 7 respectively. Recipient 7 continues the chain by providing pd4 to recipient 8, who in turn provides portable devices pd4, pd5 and pd6 to recipients 9, 10 and 11 respectively. This generates an anonymous social network of all parties shown, each of whom can selectively communicate with each other or with all others as may be desired, via the anonymous communications server computer (not shown in this Figure).

What is claimed is:

1. A method of communicating anonymously comprising:
    storing on a portable device a sender identification tag that enables communication with a sender device;
    providing the portable device to a recipient;
    the recipient interconnecting the portable device with a recipient device;
    the portable device providing the sender identification tag to the recipient device;
    the recipient device initiating communications with an anonymous communications server computer;
    the recipient device transmitting the sender identification tag to the anonymous communications server computer;
    the anonymous communications server computer using sender device contact properties associated with the sender identification tag to initiate communication with the sender device; and
    the anonymous communications server computer executing an anonymous communication session between the recipient device and the sender device;
further comprising executing an anonymous multi-party communication session in series by performing the additional steps of:
    the recipient storing on the portable device a second sender identification tag that enables communication with the recipient device;
    providing the portable device to a second recipient;
    the second recipient interconnecting the portable device with a second recipient device;
    the portable device providing the second sender identification tag to the second recipient device;
    the second recipient device initiating communications with the anonymous communications server computer;
    the second recipient device transmitting the second sender identification tag to the anonymous communications server computer;
    the anonymous communications server computer using second sender device contact properties associated with the second sender identification tag to initiate communication with the recipient device; and
    the anonymous communications server computer executing an anonymous communication session between the sender device, the recipient device, and the second recipient device.

2. The method of claim 1 wherein the recipient device initiates communications with an anonymous communications server computer by using anonymous communications server computer contact properties obtained from the portable device.

3. The method of claim 1 wherein the sender ID tag comprises the sender device contact properties enabling the anonymous communications server computer to initiate communication with the sender device.

4. The method of claim 1 wherein the anonymous communications server computer uses the sender ID tag to lookup in a sender database the sender device contact properties enabling the anonymous communications server computer to initiate communication with the sender device.

5. The method of claim 1 wherein:
    the sender device contact properties comprise a sender device telephone number;

the anonymous communications server computer initiates communication with the sender device by calling the sender device using the sender device telephone number; and the anonymous communication session is an anonymous telephone call between the recipient device and the seller device that is bridged through the anonymous communications server computer such that the sender device is unable to determine the telephone number of the recipient device and the recipient device is unable to determine the telephone number of the sender device.

6. The method of claim 1 wherein:

the sender device contact properties comprise a sender device telephone number;

the anonymous communications server computer initiates communication with the sender device by sending a recipient text message to the sender device using the sender device telephone number; and the anonymous communication session is an anonymous text messaging session between the recipient device and the seller device that is bridged through the anonymous communications server computer such that the sender device is unable to determine the telephone number of the recipient device and the recipient device is unable to determine the telephone number of the sender device.

7. The method of claim 6 wherein the anonymous text messaging session between the recipient device and the sender device that is bridged through the anonymous communications server computer is executed by:

the sender device receiving the recipient text message from the anonymous communications server computer;

the sender device generating a response text message and sending the response text message to the anonymous communications server computer; and the anonymous communications server computer receiving the response text message and sending the response text message to the recipient device.

8. The method of claim 1 wherein:

the sender device contact properties comprise a sender device email address;

the anonymous communications server computer initiates communication with the sender device by sending a recipient email message to the sender device using the sender device email address; and the anonymous communication session is an anonymous email messaging session between the recipient device and the seller device that is bridged through the anonymous communications server computer such that the sender device is unable to determine the email address of the recipient device and the recipient device is unable to determine the email address of the sender device.

9. The method of claim 8 wherein the anonymous email messaging session between the recipient device and the sender device that is bridged through the anonymous communications server computer is executed by:

the sender device receiving the recipient email message from the anonymous communications server computer;

the sender device generating a response email message and sending the response email message to the anonymous communications server computer; and the anonymous communications server computer receiving the response email message and sending the response email message to the recipient device.

10. The method of claim 1 wherein the recipient device is a smartphone comprising a dock connector and the portable device comprises a mating connector, and wherein the step of the recipient interconnecting the portable device with a recipient device comprises inserting the mating connector of the portable device into the dock connector of the smartphone.

11. The method of claim 1 wherein the recipient device is a tablet computing device comprising a dock connector and the portable device comprises a mating connector, and wherein the step of the recipient interconnecting the portable device with a recipient device comprises inserting the mating connector of the portable device into the dock connector of the tablet computing device.

12. The method of claim 1 further comprising the steps of:

storing on the portable device a sender information file, and enabling the recipient device to access the sender information file when the recipient device is interconnected to the portable device.

13. The method of claim 12 wherein the sender information file comprises an image file, and wherein the image file is displayed on the recipient device.

14. The method of claim 12 wherein the sender information file comprises a video file, and wherein the video file is played back on the recipient device.

15. The method of claim 12 wherein the sender information file comprises an audio file, and wherein the audio file is played back on the recipient device.

16. The method of claim 12 wherein the sender information file comprises a text file, and wherein the text file is displayed on the recipient device.

17. The method of claim 1 further comprising the recipient device transmitting a recipient information file to the sender device via the anonymous communications server computer.

18. The method of claim 17 wherein the recipient information file comprises an image file, and wherein the image file is displayed on the sender device.

19. The method of claim 17 wherein the recipient information file comprises a video file, and wherein the video file is played back on the sender device.

20. The method of claim 17 wherein the recipient information file comprises an audio file, and wherein the audio file is played back on the sender device.

21. The method of claim 17 wherein the recipient information file comprises a text file, and wherein the text file is displayed on the sender device.

* * * * *

UNITED STATES PATENT AND TRADEMARK OFFICE
CERTIFICATE OF CORRECTION

| | | |
|---|---|---|
| PATENT NO. | : 9,021,032 B2 | Page 1 of 1 |
| APPLICATION NO. | : 13/399259 | |
| DATED | : April 28, 2015 | |
| INVENTOR(S) | : Richard Postrel | |

It is certified that error appears in the above-identified patent and that said Letters Patent is hereby corrected as shown below:

Title Page
Item (12), "Richard" should be changed to --Postrel--.
Item (76), "Postrel Richard" should be changed to --Richard Postrel--.

Signed and Sealed this
Nineteenth Day of April, 2016

Michelle K. Lee
*Director of the United States Patent and Trademark Office*